B. GILBERT.
CORN SHELLER.
No. 10,390. Patented Jan. 3, 1854.
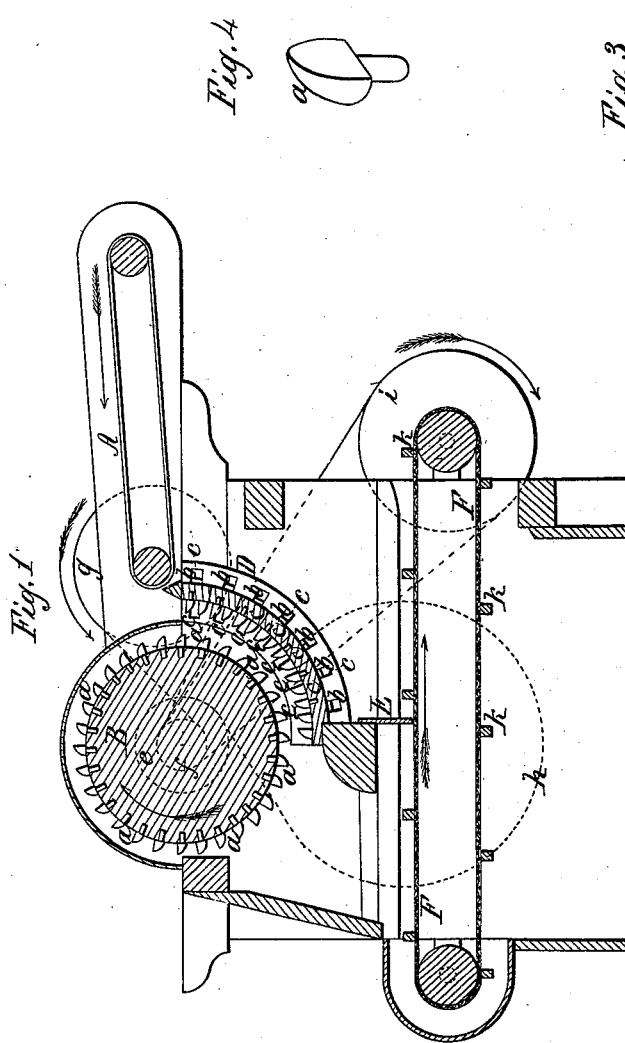
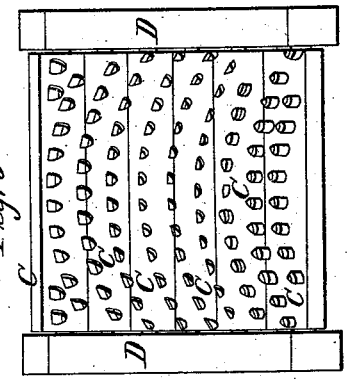
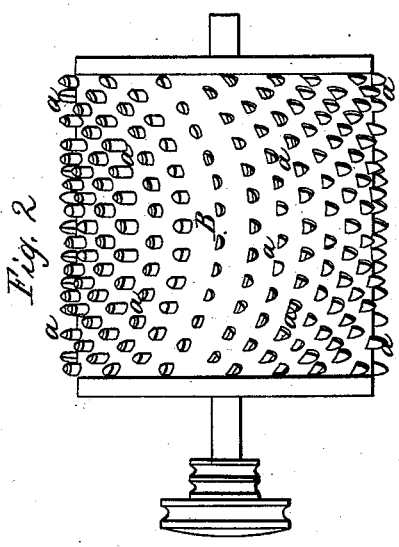

UNITED STATES PATENT OFFICE.

BANFORD GILBERT, OF STRONGSVILLE, OHIO.

CORN-SHELLER.

Specification of Letters Patent No. 10,390, dated January 3, 1854.

*To all whom it may concern:*

Be it known that I, BANFORD GILBERT, of Strongsville, Cuyahoga county, Ohio, have invented a new and useful Improvement in Corn-Shellers; and I do hereby declare that the following is a full, clear, and exact description thereof, reference being had to the annexed drawings, forming part of this specification, wherein—

Figure 1 is a vertical longitudinal section through the center of my corn sheller. Fig. 2 is a top view or plan of the shelling cylinder detached. Fig. 3 is an interior face view of the concave bed detached. Fig. 4 is a perspective view of one of the shelling teeth detached, so as to represent its peculiar shape.

In each figure the same letters are used to denote like parts of my corn sheller.

My invention consists in the shape of the teeth used in my corn-sheller, which are specially adapted to shelling corn without injuring either the kernel or the cob; also in the arranging of these teeth both on the cylinder and the concave bed in curvilinear rows, the motion of the cylinder being in a direction toward the center of the circle of which the rows of teeth would form an arc, and the rows on the concave bed being placed in the opposite direction; also in the combination with the other parts of my machine of a screen to separate the cob from the kernels of corn, and the self adjusting concave bed which accommodates itself automatically to the size and shape of the several ears of corn and to their decreasing size as they are stripped of their kernels in passing through the machine.

To enable others skilled in the art to make and use my machine, I will proceed to describe its construction and operation.

My machine consists of a suitable frame work which supports the shelling cylinder B, one half of which projects above the top of the frame, and is covered over by a semi-cylindrical cover. This cylinder revolves horizontally on its axis, and to its projecting shaft are attached the drums (or cog wheels if preferred) over which the belts or straps pass which connect it with the driving wheel $h$ and communicate motion to the apron A and screen F.

The rotary shelling cylinder B (which turns in the direction indicated by the arrow in Fig. 1,) is furnished with iron teeth, which are placed on the cylinder in curvilinear rows. These rows are at uniform distances apart all around the cylinder, and the teeth forming each row are also equidistant from each other. Each row of teeth forms a curve or segment of a circle, the shord of the arc of which is parallel to the axis of the cylinder, and the teeth in each row are severally opposite to an intervening space between the teeth in the succeeding row. The rows of teeth on the cylinder curve in the direction opposite to that in which the cylinder turns. The shape of the teeth is shown in Fig. 4. The front or face of these teeth is a plane surface in the shape of a Gothic arch the broadest part of the tooth being at the base where it is attached to the cylinder. The teeth have a semi-circular base (or nearly so) and arch in all directions from the face. They are marked $a$, $a$, &c., on the drawings. These teeth are set with their flat faces toward the center of the curve formed by the row of teeth to which they respectively belong.

The concave bed (see Fig. 3) is in shape the quadrant or fourth part of a hollow cylinder, and is situate in respect to the shelling cylinder so that the upper edge is in the same horizontal plane as the axis of the cylinder B, while the lower edge is in the vertical plane of the axis of the cylinder B. The cylinder B and the concave bed, are not however concentric, the upper edge of the concave bed, being somewhat farther from the center of the cylinder B than the lower edge. The concave bed is thus constructed. Two strips D, D, form the side pieces which carry the strips C, C, C, &c. These strips are of uniform length and breadth and are placed side by side and nearly touching each other. The extremities of these strips C, C, work in slots $c$, $c$, &c., in the side pieces D, D. This secures the strips in their places and yet admits of their vibrating in the direction of radii of the circle. Behind each strip C, C, and attached to the side pieces D, D, is a spring $b$ which working against the strips, press them up toward the cylinder, and yet admit of their yielding so as to accommodate themselves exactly to the size and shape of the ear of corn passing between them and the cylinder. The sliding pieces D, D, and with them the strips C, C, &c., forming the concave bed, are attached to the frame work of the machine, and yet so as to admit of their being adjusted by being slid nearer to or farther from the cylinder as circumstances may require. The inner face, or concave surface of this bed is studded with teeth, similar in shape to those on the cylinder B, and placed in similar curvilinear rows, the rows in the cylinder, however, being placed in the reverse direction to those on the concave bed; and consequently the flat face of the teeth on the cylinder and concave bed, facing each other. The feeding apron A passes over the axis or shaft of the drum *g*, the edge of which is immediately over and nearly in contact with the upper end of the concave bed. The feeding apron A moves in the direction indicated by the arrow in Fig. 1. The screen F, F, is a wide endless belt passing over two rollers, horizontally across the machine and under the cylinder B and concave bed. One of these rollers is the shaft of the drum *i*, by which it is turned in the direction indicated by the arrow (see Fig. 1). This bed or screen is made of wires or strings placed at uniform distances apart from side to side of the belt, which is at least as wide as the cylinder B. The spaces between these strings are wide enough to permit the kernels of corn to pass freely through, and yet close enough to prevent the passage of the cobs. This screen might be advantageously made of net work with open meshes. The strips *k*, *k*, *k*, serve to keep the screen from contracting sidewise, and assist in carrying off the shelled cobs. A flap E made of wood or leather extends across the machine, at or near the lower extremity of the side pieces D of the concave bed, so as nearly to touch the screen F, being designed to prevent the kernels of corn flying toward the end of the machine, at which the cobs are delivered. The lower extremity of the side pieces D, D, of the concave bed projects far enough to come in contact with the extreme edges of the cylinder B (when the concave bed is pushed closest to the cylinder) before the teeth of the cylinder and concave bed are near enough to touch each other, thus preventing the possibility of their interlocking. The ends and sides of the machine are boxed up so as to prevent waste by the scattering of the kernels of corn as they pass from the shelling apparatus.

Having thus described the construction of my machine I will proceed to explain its mode of operation. The ears of corn being thrown on the feeding apron A, by a hopper or otherwise, are by it carried into the space between the cylinder B and the concave bed. So soon as the ears fall between the wheels, no matter in what position they enter the machine, they are (owing to the position of the teeth), turned instantaneously on their sides, so as to pass through the machine with the axis of the cob parallel to the axis of the cylinder. The teeth of the cylinder and the concave bed being placed in curvilinear rows has also the effect to draw every ear of corn from either side toward the middle of the cylinder. The teeth are of such a shape, having a pointed, and yet not a sharp, edge, that instead of breaking the kernels of corn, they insinuate themselves between the kernels and force them off the cob, without injuring them at all. The concave bed is admirably adapted to assist in the operation; the strips C, C, not only press the ears against the cylinder, but adapt themselves to the various sizes and shapes of ears of corn which pass through the machine. Thus if an ear enters the machine which tapers so much as to be considerably larger at its lower than at its upper extremity, the slats (which can vibrate not only in planes parallel to the periphery of the cylinder, but if necessary in planes slightly oblique), will at once accommodate themselves to this configuration, and press evenly on all parts of the ear, or if a small and a large ear are in the machine at the same time, passing between the cylinder and bed, the different slats in the bed will accommodate themselves to these circumstances, and press equally on both ears. The effect of this self adjusting property of the concave bed, in combination with the shape of the teeth and their curvilinear arrangement is that every cob is completely stripped of its corn without injuring the kernels in the slightest degree. So soon as the corn and the cobs have passed between the cylinder and bed they fall on the screen F, F, the kernels all passing through it as they fall, while the cobs are conveyed by the passage of the screen outside of the machine.

Having thus described the construction and operation of my machine, I do not claim as new the use of the feeding apron nor the use of a toothed cylinder, or screen separately considered. But

What I do claim as my invention and desire to secure by Letters Patent is—

The constructing of the teeth on the cylinder and concave bed of the peculiar form described in the foregoing specification and accompanying drawings and arranging the same in curved rows so that during the revolution of the cylinder the concavity of the rows of teeth on the cylinder meets the concavity of the rows of teeth on the concave bed; in combination with the screen or separator, and the self adjusting concave bed in the manner and for the purposes hereinbefore set forth.

In testimony whereof I have hereunto signed my name before two subscribing witnesses.

BANFORD GILBERT.

Witnesses:
J. J. ST. CLAIR,
C. N. ST. CLAIR.